United States Patent [19]
Ellis et al.

[11] Patent Number: 5,425,459
[45] Date of Patent: Jun. 20, 1995

[54] STONE SEPARATION TABLE FOR POTATOES AND OTHER ROOT CROPS

[76] Inventors: Malcolm P. Ellis; Jaye A. Ellis, both of Ellis Farms, P.O. Drawer R, Rte. 227, Ashland, Me. 04732-0557

[21] Appl. No.: 103,189

[22] Filed: Aug. 6, 1993

[51] Int. Cl.$^6$ .............................................. B07B 13/05
[52] U.S. Cl. .................... 209/671; 209/667; 209/668
[58] Field of Search .............. 209/659, 667, 668, 669, 209/671, 672, 673, 931

[56] References Cited

U.S. PATENT DOCUMENTS

| | | | |
|---|---|---|---|
| 2,244,546 | 6/1941 | Stockdale | 209/671 |
| 2,370,539 | 2/1945 | Hodecker | 209/668 |
| 2,417,921 | 3/1947 | Fox | 209/667 |
| 4,471,876 | 9/1984 | Stevenson, Jr. et al. | 209/673 X |
| 4,871,073 | 10/1989 | Berry et al. | 209/672 |

FOREIGN PATENT DOCUMENTS 878492 10/1961 United Kingdom ................ 209/671

*Primary Examiner*—Cheryl L. Gastineau
*Assistant Examiner*—Tuan N. Nguyen
*Attorney, Agent, or Firm*—Daniel H. Kane

[57] ABSTRACT

A stone separation table (30,70) selectively separates and drops stones, clods, and dirt (27) between selected rollers while conveying potatoes (33) or other root crops from one side of the table to the other. The stone separation table incorporates sets of rollers (32,72) including separating (36,76) and spacing (40,80) rollers of substantially the same diameter. The sets of rollers are coplanar forming a planar conveying level (45,75) with all rollers driven in the same direction of rotation. The separating roller (36,76) is constructed with projecting elements, either projecting fingers (38) of a star roller (36) or bristles (78) of a brush roller (76) for receiving stones, clods, and dirt (27) for rotation downward and dropping in the separating passageway (42,82) between the separating roller (36,76) and spacer roller (40,80). The stone separation table (30,70) is incorporated in a standard potato harvester (25) or other root crop harvester at one of the horizontal conveying levels (45,75) of the harvester.

8 Claims, 7 Drawing Sheets

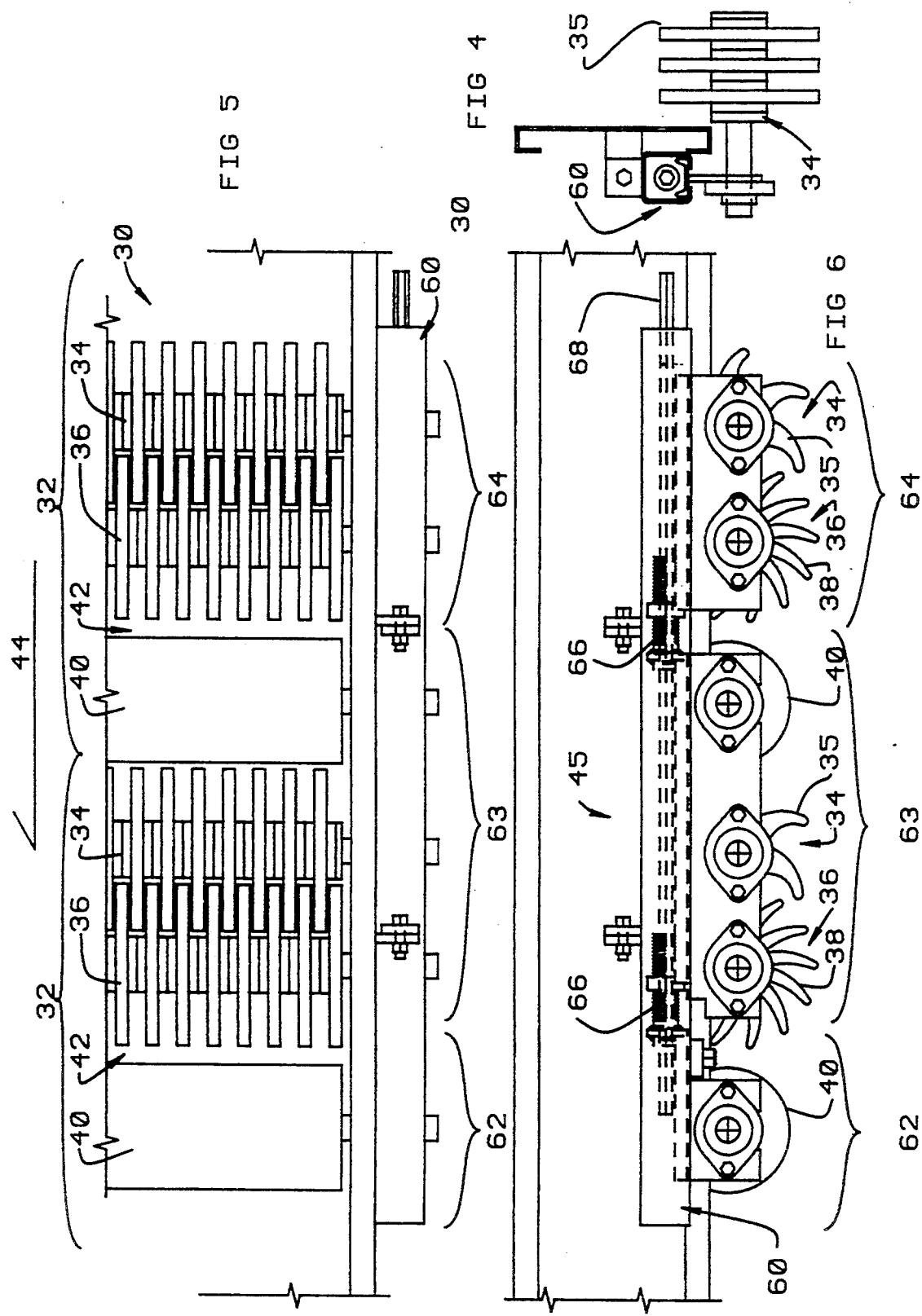

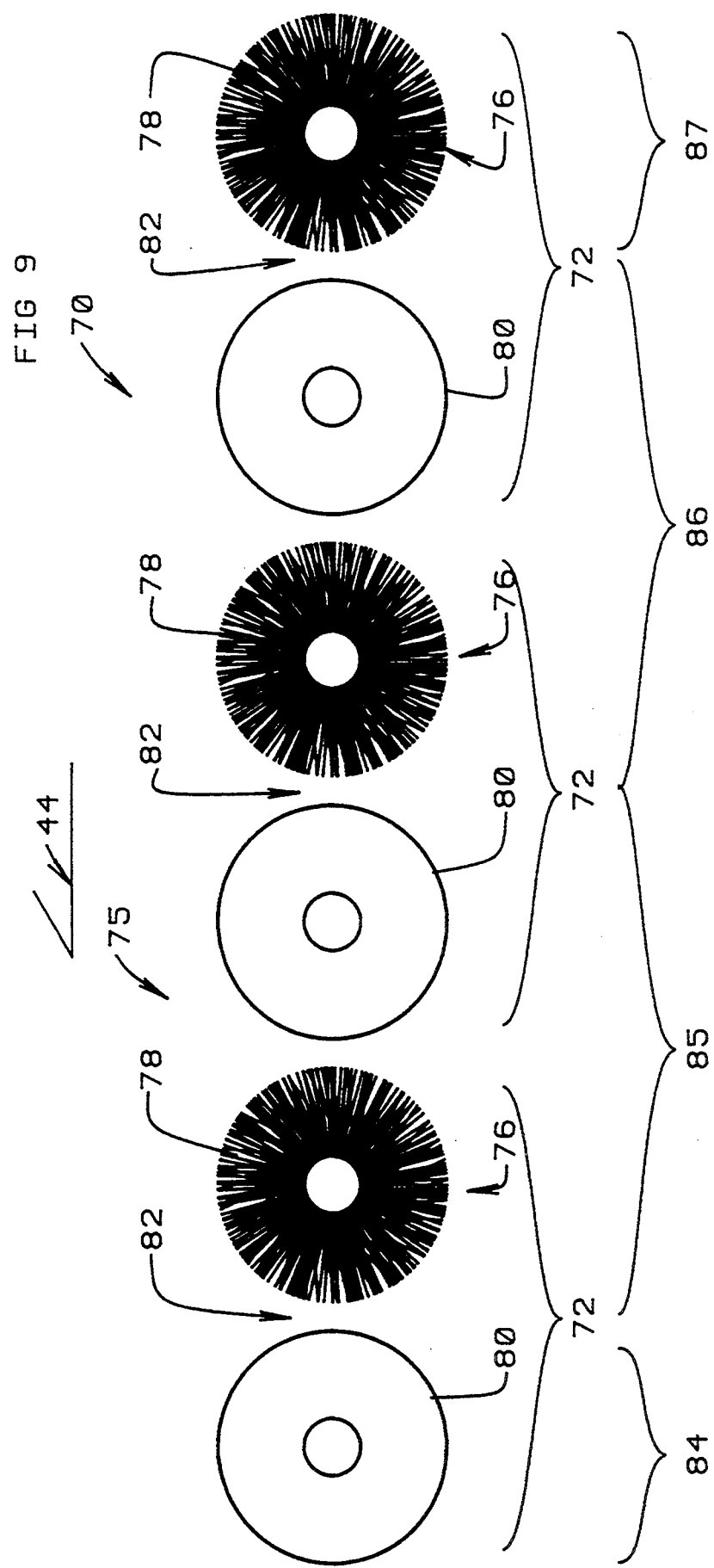

STONE SEPARATION TABLE FOR POTATOES AND OTHER ROOT CROPS

TECHNICAL FIELD

This invention relates to a new stone separation table for selectively separating and dropping stones, clods, and dirt between selected rollers while conveying potatoes or other root crops from one side of the table to the other. The stone separation table incorporates sets of rollers including separating rollers and spacing rollers of substantially the same diameter forming a substantially planar conveying level with all rollers driven in the same direction of rotation. As a result, the stone separation table can be incorporated into a standard potato harvester or other root crop harvester at one of the conveying levels of the harvester.

BACKGROUND ART

A conventional stone separation table (SST) 10 manufactured by Franz Grimme Landmaschinenfabrik GmbH & Co. KG, Wiesenstrasse, Postfach 1280, D-2845 Damme/Dummer, Germany, and sold under the trademark "ROLLER STAR" (TM), is illustrated in FIG. 1. The SST incorporates multiple sets of rollers 12 in adjacent sequence for transporting root crops from one side of the table 10 to the other side. Each set of rollers 12 includes a first conveying and cleaning roller 14 with projecting fingers 15 intermeshing with a second separating roller 16 also formed with projecting fingers 18. The projecting fingers 15 of cleaning rollers 14 clean dirt and mud from the projecting fingers 18 of separating rollers 16. The cleaning rollers 14 may be constructed with fewer projecting fingers 15, e.g. a six finger star roller, than the separating roller 16, e.g. a 12 finger star roller. The rollers 14 and 16 are driven in the same direction of rotation for conveying potatoes or other root crops across the tops of the projecting fingers. The projecting fingers are typically curved in the direction away from the direction of rotation of the star rollers.

The third roller of each set of rollers 12 is a counter rotating pinch roller 20 having a substantially smaller diameter than the separating roller 16. The smaller diameter counter rotating pinch roller 20 causes a level drop off following the separating roller 16. The larger root crops are passed by the tips of the projecting fingers 18 over the smaller pinch roller 20 to the next set of rollers 12. The spacing of the projecting fingers 18 of separating roller 16 receives smaller stones, clods and dirt between the fingers for delivery to the "pinch" valley between the counter rotating rollers 16,20. The stones, clods and dirt are "pinched", rotate downward, and are separated by dropping below the SST.

Because of the counter rotating pinch roller 20 of significantly unequal and smaller diameter, it is necessary that the second set of rollers 12 in the downstream conveying direction be positioned below the first set 12 for continuous conveyance of the root crops. As a result the SST conveyor must be constructed with a diagonal or downward pitch to be operational. An SST might typically be composed of two or three sets of rollers oriented in a downward stepping or diagonally downward direction.

A disadvantage of the necessary pitch associated with the prior art SST 10 is that it cannot be incorporated in the United States style potato harvester formed with horizontal planar conveying levels. Such potato harvesters are manufactured for example by lockwood Corporation of Gerring, Nebraska; Logan Corporation of Logan, Iowa; Art's Way of Armstrong, Iowa; Double L Manufacturing Company, Inc., American Falls, Idaho; and Thomas Equipment of Centerville, New Brunswick, Canada. Another disadvantage of the Grimme type SST is that the counter rotating pinch roller 20, despite its small diameter, may still pinch and bruise root crops passing over the downwardly pitched conveyer.

OBJECTS OF THE INVENTION

It is therefore an object of the present invention to provide a new stone separation table which forms a substantially planar and substantially horizontal conveying level for retrofitting the new SST on a substantially horizontal and planar conveying level of a United States style potato harvester or other root crop harvester.

Another object of the invention is to provide a new SST without counter rotating pinch rollers to avoid pinching and bruising of root crops conveyed across the SST.

A further object of the invention is to provide an alternative brush roller type separator roller having bristles capable of distinguishing between root crops and smaller stones, clods and dirt.

DISCLOSURE OF THE INVENTION

In order to accomplish these results the invention provides a stone separation table having a plurality of sets of rollers for conveying potatoes or other root crops from one side of the table to the other and for selectively separating and dropping stones, clods, and dirt between selected rollers. According to the invention the sets of rollers each comprise a separating roller and a spacing roller spaced a selected distance from the separating roller. The rollers of each set of rollers have substantially similar diameters. The sets of rollers are aligned with the axes of rotation of the respective rollers substantially coplanar so that the perimeters of the rollers define a substantially planar conveying level for the stone separation table. A roller drive drives all the respective rollers of the sets of rollers in the same direction of rotation for conveying root crops across the substantially planar conveying level.

Each separating roller of the sets of rollers is constructed with radially projecting elements defining the perimeter of the separating roller. The radially projecting elements are constructed to receive stones, clods, and dirt smaller than the root crops for rotation downward and dropping between the separating roller and spacer roller. Each spacing roller of the sets of rollers is constructed with a perimeter providing a smooth low friction surface spaced a selected distance from the separating roller. The spacing roller and separating roller define a separating passageway for sliding passage of stones, clods, and dirt downward between the separating roller and spacing roller..

According to the preferred embodiment the radially projecting elements of the separating rollers comprise projecting fingers spaced apart selected spaces for receiving stones, clods, and dirt between the projecting fingers. The stones, clods, and dirt are then separated by rotation downward and sliding passage through the separating passageway between the separating and spacing rollers. At the same time root crops are passed in the conveying direction across the conveying level on the tips of the projecting fingers of the separating roller and on the surface of the spacing roller. The sets of rollers may each include a third roller adjacent to the separating roller having the same or substantially similar diameter and being driven in the same direction of rotation. The third roller is a conveying and cleaning roller positioned upstream from the separating roller relative to the conveying direction of the stones separation table. The cleaning roller is formed with radially projecting fingers which intermesh with the separating roller for cleaning the separating roller.

The invention also provides a proportional spacing mechanism or spacing adjuster coupled to selected groups of rollers of the sets of rollers for adjusting the width of the separating passageway between the separating and spacing rollers of the respective sets of rollers in equal increments.

The invention is applied in a potato harvester having multiple conveying levels for delivering harvested root crops. The potato harvester incorporates a stone separation table according to the invention at one of the planar levels of the potato harvester.

According to an alternative embodiment of the invention, the separating roller of the sets of rollers is a brush roller. The radial projecting elements are brush bristles constructed for conveying root vegetables along the substantially planar conveying level. The roller brush bristles on the other hand are constructed to receive stones, clods, and dirt smaller than the root vegetables for rotation downward and dropping between the separating and spacing rollers. By way of example, the roller brush bristles may be constructed to yield to the smaller stones, clods, and dirt. According to another embodiment the brush roller bristles are distributed in a spiral around the brush roller with spacing between the turns of the spiral for receiving stones, clods, and dirt while passing larger root crops across the conveying level.

Other objects, features, and advantages of the invention are apparent in the following specification and accompanying drawings.

BRIEF DESCRIPTION OF THE DRAWINGS

FIG. 4 is a detailed fragmentary .end view of the track suspension of selected groups of rollers for adjustable spacing by a spacing adjuster or proportional spacing mechanism.

FIG. 5 is a fragmentary plan view from above of the intermeshing rollers of the SST and FIG. 6 is a corresponding fragmentary side elevation view also showing the grouping of rollers for adjustable spacing between separating and spacer rollers.

FIG. 9 is a diagrammatic side view of the rollers for an alternative embodiment of the SST using brush rollers for the separating rollers and thereby eliminating the cleaning rollers.

DESCRIPTION OF PREFERRED EXAMPLE EMBODIMENTS AND BEST MODE OF THE INVENTION

Figure 1:
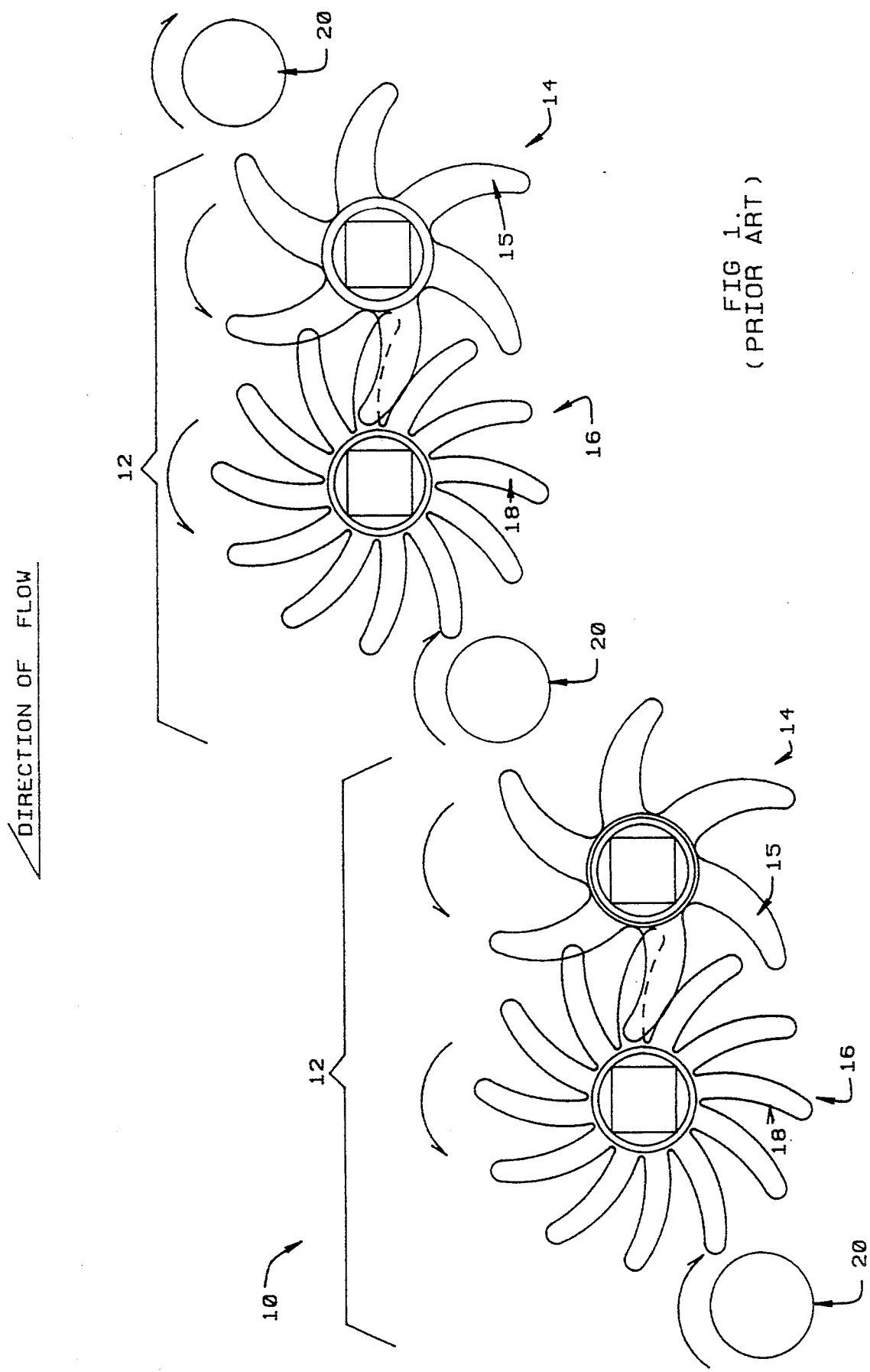
FIG. 1 is a diagrammatic side view of the downwardly stepped sets of rollers of a prior art stone separation table.
Figure 2:
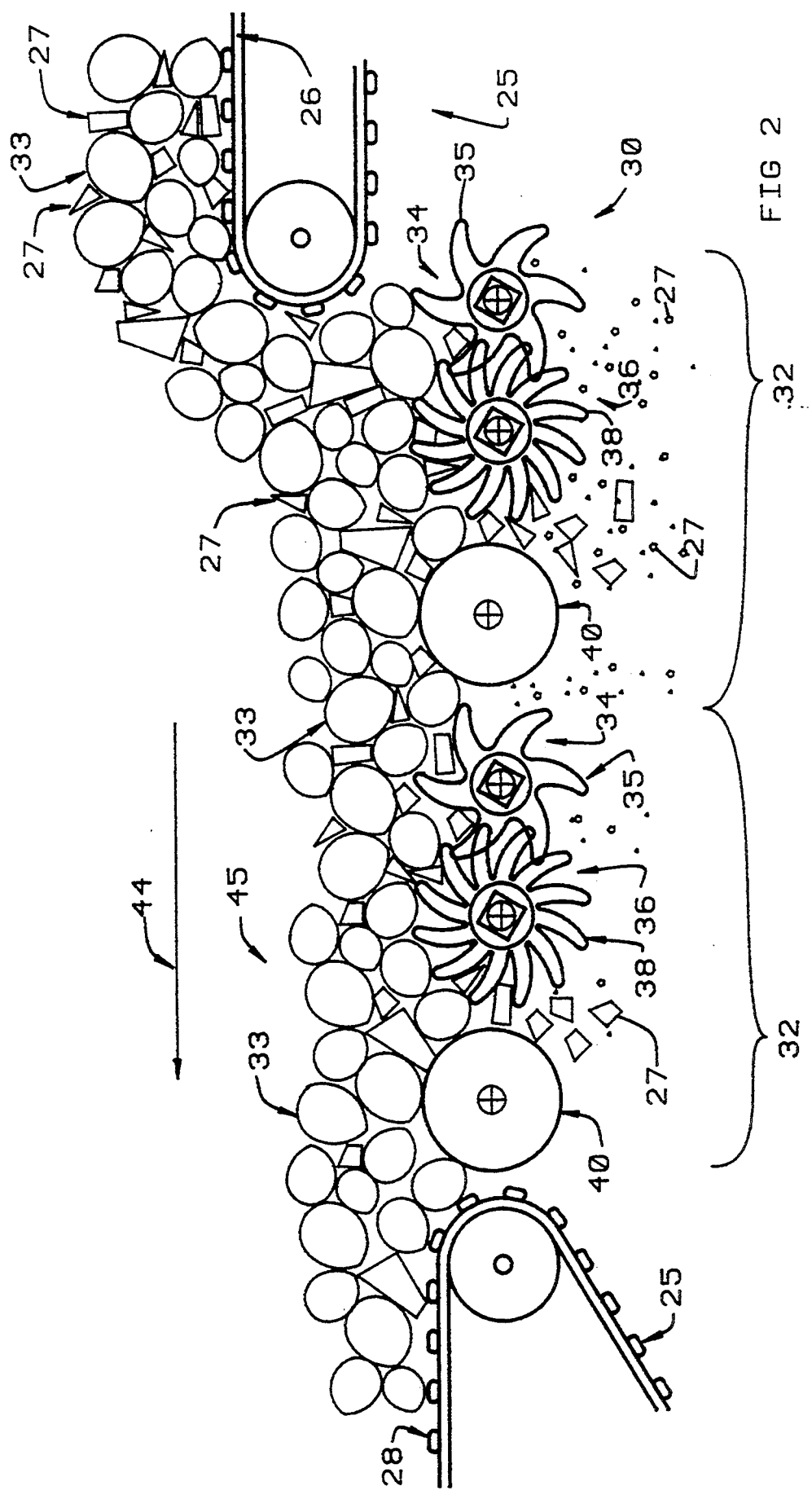
FIG. 2 is a diagrammatic side view of the coplanar sets of rollers of the SST according to the present invention incorporated at a horizontal conveying level between conveyers of a potato harvester.
Figure 3:
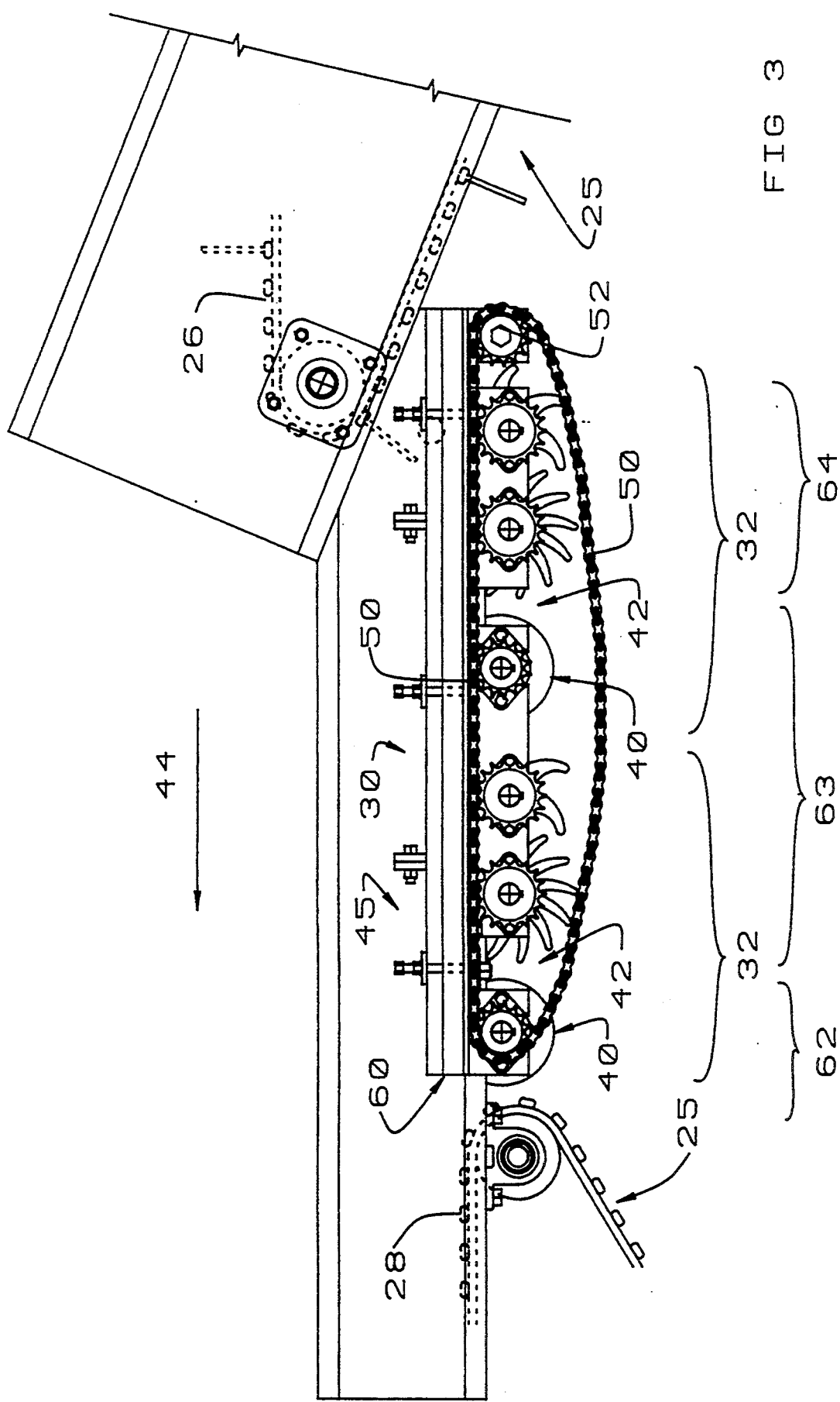
FIG. 3 is a more detailed diagrammatic side view of the stone separation table incorporated in a potato harvester showing the chain drive for driving all rollers in the same direction of rotation and showing the separate suspension of selected groups of rollers for adjustable spacing between separating rollers and spacer rollers.
Figure 7:
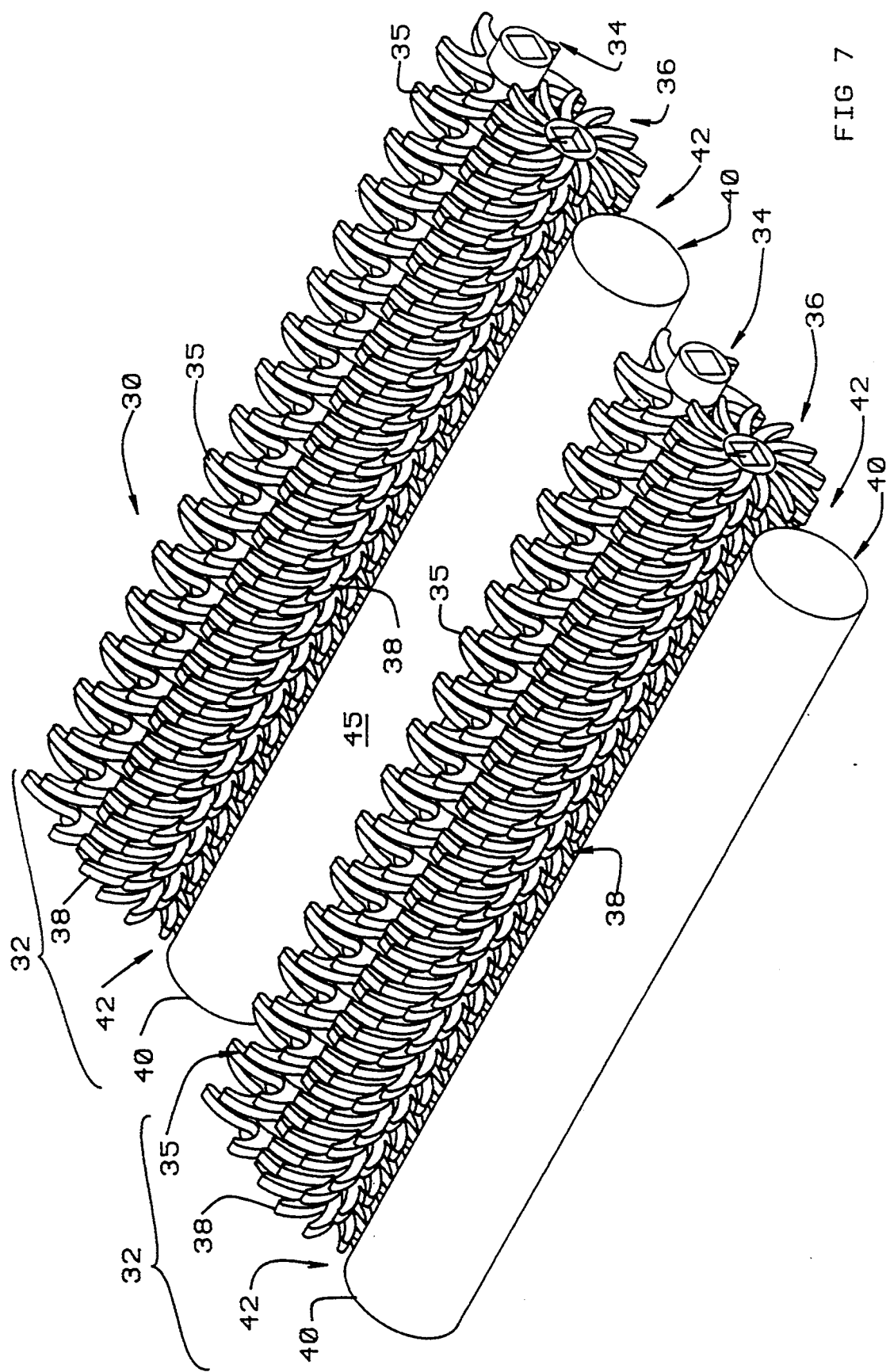
FIG. 7 is a fragmentary perspective view from above of the rollers of the SST showing the two adjacent coplanar sets of rollers.
Figure 8:
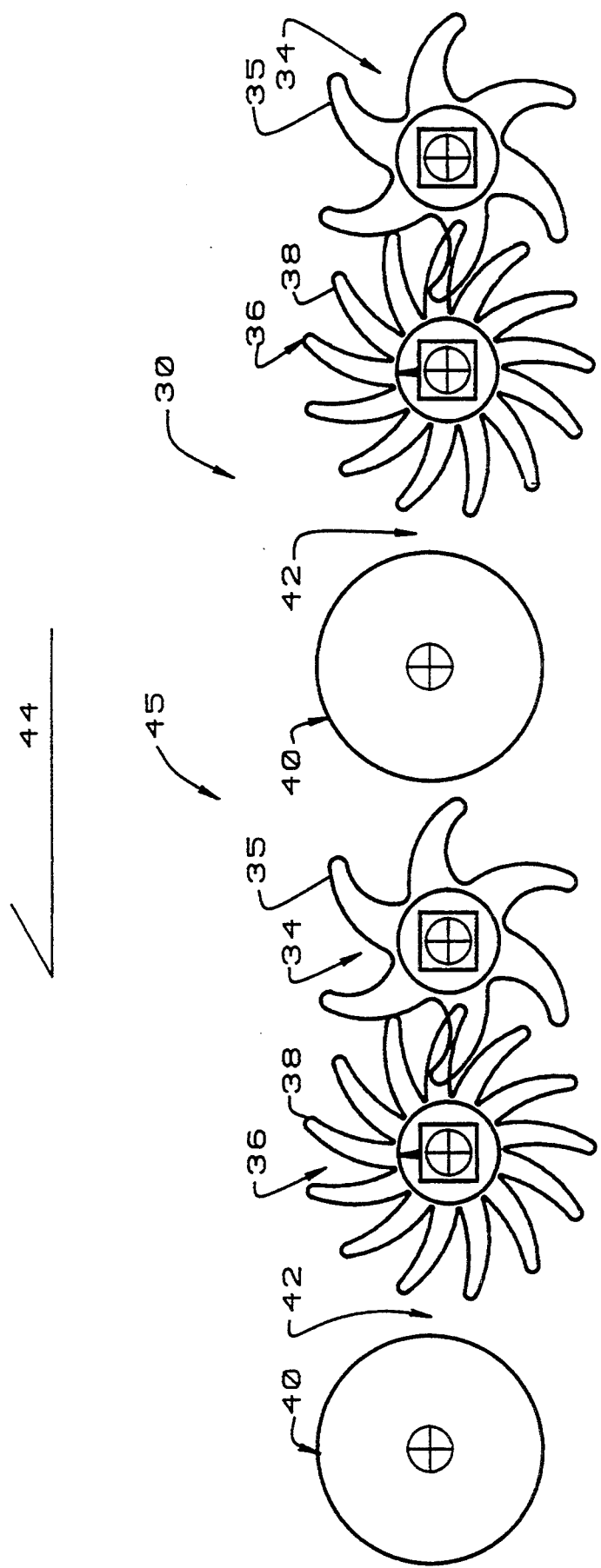
FIG. 8 is a detailed fragmentary diagrammatic side view of the rollers showing the spacing of the rollers.

A stone separation table SST 30 according to the invention incorporated in a potato harvester 25 is illustrated in FIGS. 2,3,5,7, and 8. The SST 30 includes multiple sets of rollers 32 in adjacent sequence for transporting root crops such as potatoes 33 from one side of the table 30 to the other side. Conveyor 26 of potato harvester 25 delivers potatoes 33 mixed with stones, clods and dirt 27 to one side of the SST 30 while conveyor 28 of potato harvester 25 picks up the substantially separated potatoes 33 from the other side of SST 30.

Each set of rollers 32 includes a first conveying and cleaning roller 34 with projecting fingers 35 intermeshing with a second separating roller 36 also formed with projecting fingers 38. The first and second rollers operate in the manner described above with reference to FIG. 1. The cleaning roller 34 may be constructed with fewer projecting fingers 35, e.g. a six finger star roller, than the separating roller 36, e.g. a twelve finger star roller.

The third roller 40 of each set of rollers 32 is a spacing roller having the same or substantially similar diameter as the cleaning roller 34 and separating roller 36. The spacing roller 40 is formed with a smooth hard low friction surface for example of stainless steel or durable plastic. The spacing roller 40 is spaced a selected distance from the separating roller 36 for each set of rollers 32 defining a separating passageway 42 for sliding passage and selective dropping of stones, clods, and dirt 27. The radially projecting fingers 38 of spacing roller 36 are themselves constructed with appropriate spaces between the fingers 38 to receive stones, clods, and dirt 27 smaller than the potatoes 33 or other root crops for rotation downward and dropping through the separating passageway 42 between the separating roller 36 and spacing roller 40. At the same time, the potatoes 33 are passed in the conveying direction 44 across the conveying level 45 on the tips of the projecting fingers 35,38 of the cleaning and separating rollers 34,36 and the surface of the spacing roller 40.

The rollers 34,36,40 of each set of rollers 32 have substantially the same diameter and are aligned with the respective axes of rotation substantially coplanar. The perimeters of the rollers therefore define a substantially planar and horizontal conveying level 45 for the SST 30. A roller chain drive 50 driven by drive roller 52 drives all the respective rollers 34,36,40 of the sets of rollers 32 in the same direction of rotation. Root crops are thereby conveyed in the conveying direction 44 across the planar and horizontal conveying level 45 from one side of the SST 30 to the other.

In order to provide controllable and variable spacing of the separating passageways 42 between the spacing rollers 40 and separating rollers 36, the rollers 34,36,40 are suspended on a track 60 as illustrated in FIGS. 3,4,5 and 6 for controlled sliding motion along the track to adjust the spacing. To this end the rollers are suspended in groups, for example selected groups 62,63, and 64 which move as respective units relative to each other. For example group 62 is a single spacing roller 40 at the ,downstream end of the SST 30; group 63 is a separating roller 36, cleaning roller 34, and spacing roller 40 in the middle of the SST 30; and group 64 is a separating roller 36 and cleaning roller 34 at the upstream end of the SST 30.

The unitary groups 62,63 and 64 are coupled together in sequence on the track by a proportional :spacing mechanism 66 with drive shaft 68 of the type described in the Malcolm P. Ellis U.S. Pat. No. 5,012,688, issued May 7, 1991 and U.S. Pat. No. 4,979,624, issued Dec. 25, 1990 which patent disclosures are incorporated herein by reference.

An alternative stone separation table 7 composed of sets of rollers 72 is illustrated in FIG. 9. In this example each set of rollers 72 consists of two rollers, a separation roller 76 and a spacing roller 80 having substantially the same diameter. The separation rollers 76 are brush rollers and the radially projecting elements 78 brush bristles constructed with sufficient density and stiffness for conveying root vegetables in the conveying direction 44 along the substantially planar conveying level 75 as the rollers 76,80 turn in the same direction of rotation. The separating roller brush bristles 78 are also constructed to receive stones, clods and dirt smaller than the root vegetables for rotation downward and dropping through the separating passageways 82 between respective separating rollers 76 and spacing rollers 80 of the respective pairs of rollers 72.

For example, the separating roller brush bristles 78 may be constructed to yield i.e. by bending in response to smaller, higher specific gravity, stones, clods and dirt for rotation downward and dropping in the separating passageways 82 between respective separating rollers 76 and spacing rollers 80. According to another embodiment, the brush roller bristles 78 are distributed in a spiral around the separating brush roller 76 with spacing between turns of the spirals for receiving stones, clods, and dirt smaller than the root vegetables while passing the larger root vegetables across the conveying level 75. The use of brush rollers for the separating rollers 76 obviates the need for the cleaning rollers 34 described with reference to the embodiment of FIGS. 1-8.

For adjusting the spacing between separating rollers 76 and spacing rollers 80 for varying the size of the separating passageways 82, the rollers 76,80 are suspended on a track as described above in unitary groups 84,85,86, and 87. The suspension groups 84,85,86 and 87 are coupled to each other by the spacing mechanisms and drive shaft as set forth in U.S. Pat. Nos. 5,012,688 and 4,979,624 referenced above.

While the invention is described with reference to example embodiments, it is intended to cover all modifications and equivalents within the scope of the following claims.

We claim:

1. A stone separation table having a plurality of sets of rollers for conveying root crops from one side of the table to the other and for selectively separating and dropping stones, clods, and dirt between selected rollers comprising:

said sets of rollers each comprising a separating roller and a spacing roller spaced a selected distance from the separating roller, said rollers of each set of rollers having substantially similar diameters, said sets of rollers being aligned with the axes of rotation of the respective rollers substantially in a common plane so that the perimeters of the rollers define a substantially planar conveying level for the stone separation table;

roller drive means driving all the respective rollers of the sets of rollers in the same direction of rotation for conveying root crops across the substantially planar conveying level;

each separating roller of the sets of rollers comprising a brush roller having radially projecting brush bristles defining the perimeter of the separating roller said brush bristles being constructed for conveying said root crops along the substantially planar conveying level and being constructed to receive stones, clods, and dirt smaller than the root crops between the bristles for rotation downward and dropping between the separating roller and spacer roller;

each spacing roller of the sets of rollers comprising a perimeter providing a smooth low friction surface spaced said selected distance from the separating roller and defining a separating passageway for sliding passage of stones, clods, and dirt downward between the separating roller and spacing roller.

2. The stone separation table of claim 1 wherein the brush bristles of said brush roller are distributed in a spiral around the brush roller with spacing between turns of the spiral for receiving stones, clods, and dirt but passing said root crops.

3. The stone separation table of claim 1 comprising a proportional spacing mechanism coupled to selected groups of rollers of the sets of rollers for adjusting the separating passageways between the separating and spacing rollers of the respective sets of rollers in equal increments by moving the selected groups of rollers in proportionately ,greater increments.

4. A potato harvester having multiple conveying levels for delivering harvested root crops, said potato harvester comprising a stone separation table as set forth in claim 1 at one of the levels of the potato harvester.

5. A stone separation table having a plurality of sets of rollers for conveying root crops from one side of the table to the other and for selectively separating and dropping stones, clods, and dirt between selected rollers comprising:

said sets of rollers each comprising a separating roller and a spacing roller spaced a selected distance from the separating roller, said rollers of each set of rollers having substantially similar diameters, said sets of rollers being aligned with the axes of rotation of the respective rollers substantially in a common plane so that the perimeters of the rollers define a substantially planar conveying level for the stone separation table;

roller drive means driving all the respective rollers of the sets of rollers in the same direction of rotation for conveying root crops across the substantially planar conveying level;

each separating roller of the sets of rollers comprising a brush roller having radially projecting brush bristles defining the perimeter of the separating roller said brush bristles being constructed for conveying said root crops along the substantially planar conveying level and being constructed to receive stones, clods, and dirt smaller than the root crops between the bristles for rotation downward and dropping between the separating roller and spacer roller, said brush bristles being constructed to yield by bending in response to said stones, clods, and dirt that are smaller and have higher specific gravity than the root crops;

each spacing roller of the sets of rollers comprising a perimeter providing a smooth low friction surface spaced said selected distance from the separating roller and defining a separating passageway for sliding passage of stones, clods, and dirt downward between the separating roller and spacing roller.

6. The stone separation table of claim 5 wherein the brush bristles of said brush roller are distributed in a spiral around the brush roller with spacing between turns of the spiral for receiving stones, clods, and dirt but passing :said root crops.

7. The stone separation table of claim 5 comprising a proportional spacing mechanism coupled to selected groups of rollers of the sets of rollers for adjusting the separating passageways between the separating and spacing rollers of the respective sets of rollers in equal increments by moving the selected groups of rollers in proportionately, greater increments.

8. A potato harvester having multiple conveying levels including a substantially horizontal planar conveying level for delivering harvested root crops, said potato harvester comprising a stone separation table as set forth in claim 5 at said substantially horizontal planar conveying level of the potato harvester.

* * * * *